C. S. CRANE.

Stationary-Engines.

No. 6,194. Reissued Dec. 29, 1874.

WITNESSES:

P. C. Dieterich

O. W. Bond

INVENTOR:

Charles S. Crane per Chas. H. Bond

ATTORNEYS.

UNITED STATES PATENT OFFICE.

CHARLES S. CRANE, OF CHICAGO, ILLINOIS.

IMPROVEMENT IN STATIONARY ENGINES.

Specification forming part of Letters Patent No. 133,926, dated December 17, 1872; reissue No. 6,194, dated December 29, 1874; application filed February 17, 1874.

*To all whom it may concern:*

Be it known that I, CHARLES S. CRANE, of the city of Chicago, in the county of Cook and State of Illinois, have invented certain new and useful Improvements in Stationary Engines, of which the following is a full, clear, and exact description, reference being had to the accompanying drawing, in which—

Figure 1:
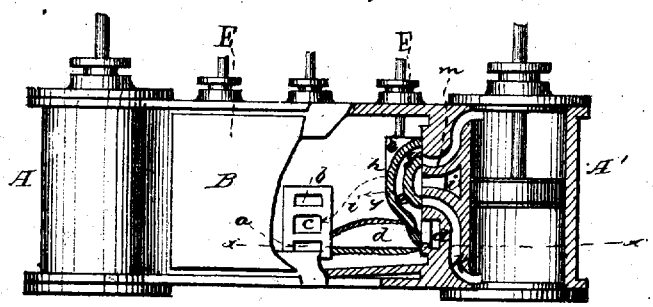

Figure 1 is an elevation, having part of the casing removed, showing the interior of the steam-chest and a vertical section of one of the cylinders, with its valves and passages, showing also a portion of the wall C cut away and the valve F removed.

Figure 2:
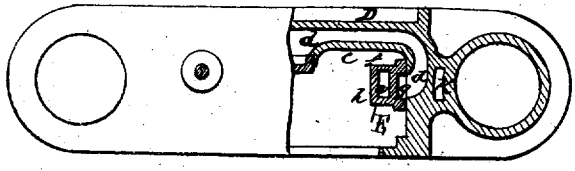
Figures 3, 4, 5:
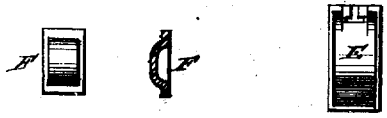

Fig. 2 shows a plan of one end. The other end of the figure is a horizontal section on line *x*, except that the valve is shown in section on line *y*. Fig 3, a plan view, and Fig. 4 a vertical transverse section, of one valve; and Fig. 5, a plan of the other valve.

My invention is designed to be used with a double-cylinder engine; and consists in a peculiar combination of the steam-chest cylinder and valves, hereinafter claimed.

In the drawing, A A′ represent two vertical cylinders; B, steam-chest; C, a partition-wall; D, one of the outer walls of the steam-chest; E, valve opening and closing the ports to the cylinder A′. This is, in fact, a double D-valve, the part *g* corresponding with the ordinary D-valve, and the part *h* being an outer casing, leaving an open space, *e*, between *g* and *h*; *a b*, ports or openings in the wall C *a*, communicating by means of the passage *d*, which is between the walls C D, with the space *e* between the two parts *g h* of the valve E; and *b* communicates, by means of a passage, *i*, similar to *d*, between the walls C D, with the under side of the valve E. The passage *i* is indicated by the dotted lines in Fig. 1. *c* is the exhaust-outlet. The ordinary D-valve F, Figs. 3 and 4, is used with the ports and openings *a b c*. *k* and *m* are induction-ports to the cylinder A′. The cylinder A is a counterpart of the cylinder A′, and is provided with a similar valve and ports, having passages from *a b* to the left similar to those shown and described. I prefer to cast the cylinders and steam-chest together, so as to form but one piece; but they may be cast separately, with suitable flanges, and be bolted or fastened together in the usual manner.

The operation is as follows: Steam is admitted to the steam-chest in the usual manner. Suppose the port *b* and exhaust-opening *c* to be covered by the valve F, steam will pass from the chest through the port *a* and passage *d* to the space *e* between the parts *g h* of the valve E. Now, if the valve E be lifted so as to open the passages *k m*, steam will pass from E through *k* to the lower end of the cylinder, and, as the piston rises, the exhaust steam will pass out through *m* beneath *g*, to and through the passage *i*, to the port *b*; thence under the valve F to the opening *c*. If, then, the valve F be moved so as to open the port *b*, and cover the port *a* and opening *c*, the operation will be reversed. Steam will pass through the port *b* and passage *i*, and come beneath the part *g* of the valve E; and, this valve being raised so as to open the ports *m* and *k*, the steam will pass through *m* to the upper end of the cylinder, and, as the piston descends, the exhaust steam will be forced out through *k* into the space *e* between *g* and *h*, and thence through passage *d* to the port *a*, and beneath the valve F to the outlet *c*. At the same time steam will pass to and from the cylinder A in the same way.

Among the advantages of this construction the following may be named: The valves, being in one chest, will all be accessible and exposed to view whenever the chest is opened, so that if anything should get out of order the defective part can be more readily discovered and remedied than if there were three separate steam-chests. The valve E will also be held in place by the pressure of the steam in the chest instead of by a spring, which has been used heretofore when this valve has been in a separate chest.

What I claim as new is as follows:

1. The combination of the cylinders A and A′ and steam-chest B with the valves E, and a suitable valve, F, ports *a b*, passages *k*, *m*, *d*, and *i*, and exhaust *c*, constructed and operating substantially as specified.

2. The steam-chest B and cylinders A A′, in combination with the double valves E and valve F, constructed as described, whereby the valves are held in position by the action of the steam in the steam-chest, substantially as and for the purpose herein specified.

CHARLES S. CRANE.

Witnesses:
L. L. BOND,
O. W. BOND.